(12) United States Patent
Henriksson et al.

(10) Patent No.: US 7,509,979 B2
(45) Date of Patent: Mar. 31, 2009

(54) METHOD AND A DEVICE FOR SLOWING DOWN AND DISINTEGRATING A PLUG OF LIQUID PLUNGING FORWARD IN A DUCT

(75) Inventors: Mats Henriksson, Älvkarleby (SE); Anders Byström, Västra Frölunda (SE)

(73) Assignee: Vattenfall AB (PUBL), Stockholm (SE)

( * ) Notice: Subject to any disclaimer, the term of this patent is extended or adjusted under 35 U.S.C. 154(b) by 409 days.

(21) Appl. No.: 10/549,666

(22) PCT Filed: Mar. 3, 2004

(86) PCT No.: PCT/SE2004/000290

§ 371 (c)(1),
(2), (4) Date: May 24, 2006

(87) PCT Pub. No.: WO2004/083709

PCT Pub. Date: Sep. 30, 2004

(65) Prior Publication Data
US 2006/0207672 A1  Sep. 21, 2006

(30) Foreign Application Priority Data
Mar. 17, 2003 (SE) .................................. 0300722

(51) Int. Cl.
*F24H 9/12* (2006.01)
(52) U.S. Cl. .............................. 138/42; 138/39; 138/37; 138/114
(58) Field of Classification Search .................. 138/42, 138/44, 37, 39, 114
See application file for complete search history.

(56) References Cited

U.S. PATENT DOCUMENTS

| 3,430,659 | A | | 3/1969 | Henderson |
| 4,118,173 | A | * | 10/1978 | Shakiba ...................... 431/202 |
| 4,154,264 | A | | 5/1979 | Schaller |
| 4,205,655 | A | * | 6/1980 | Hunt ........................... 126/635 |
| 4,452,233 | A | * | 6/1984 | Goodman et al. ........... 126/653 |
| 4,846,228 | A | | 7/1989 | Blanscet |
| 4,965,107 | A | * | 10/1990 | Oshima et al. ............. 428/34.4 |
| 7,137,413 | B2 | * | 11/2006 | Bauer et al. .................. 138/39 |
| 2003/0000588 | A1 | | 1/2003 | Kuykendal et al. |

* cited by examiner

*Primary Examiner*—Patrick F Brinson
(74) *Attorney, Agent, or Firm*—Young & Thompson

(57) ABSTRACT

A device for slowing down and disintegrating a plug of liquid plunging forward in a duct includes a container having a bottom and an opposite inlet, which is connectable to the duct and through which the plug of liquid can be directed into a central, axial trajectory in the container. Inside the container is an inner tube, open towards the bottom, which separates an inner hollow space from an outer, cross-section-wise ring-shaped hollow space, a distributor body being arranged in the trajectory of the entering plug of liquid for splitting and disintegrating the plug of liquid as well as throwing out the disintegrated constituent parts of liquid in the direction outwards from the center. The bottom includes a concavely curved guide surface for diverting the liquid from one of the hollow spaces to the other to reverse the direction of motion of the liquid. A corresponding method is also provided.

19 Claims, 2 Drawing Sheets

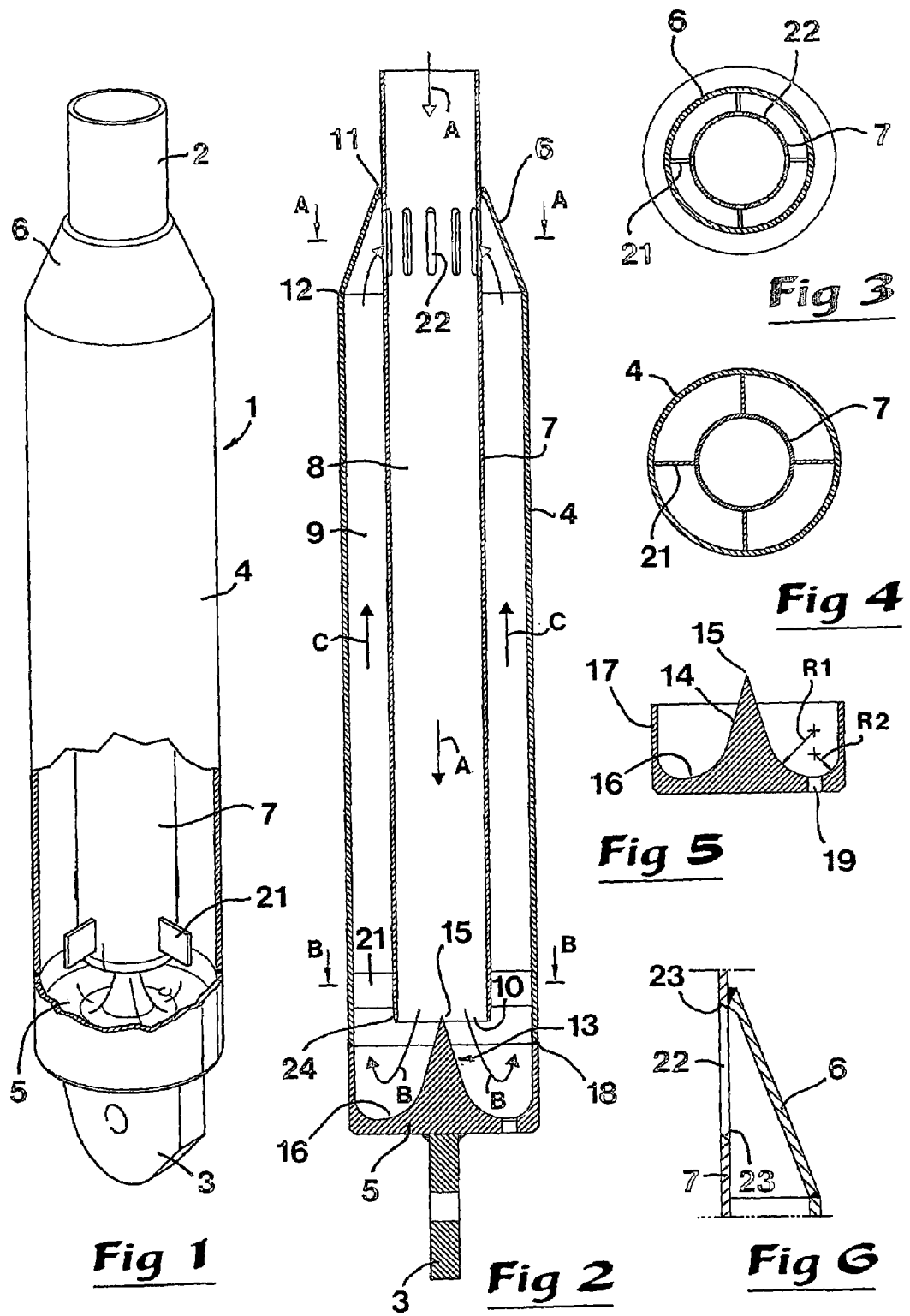

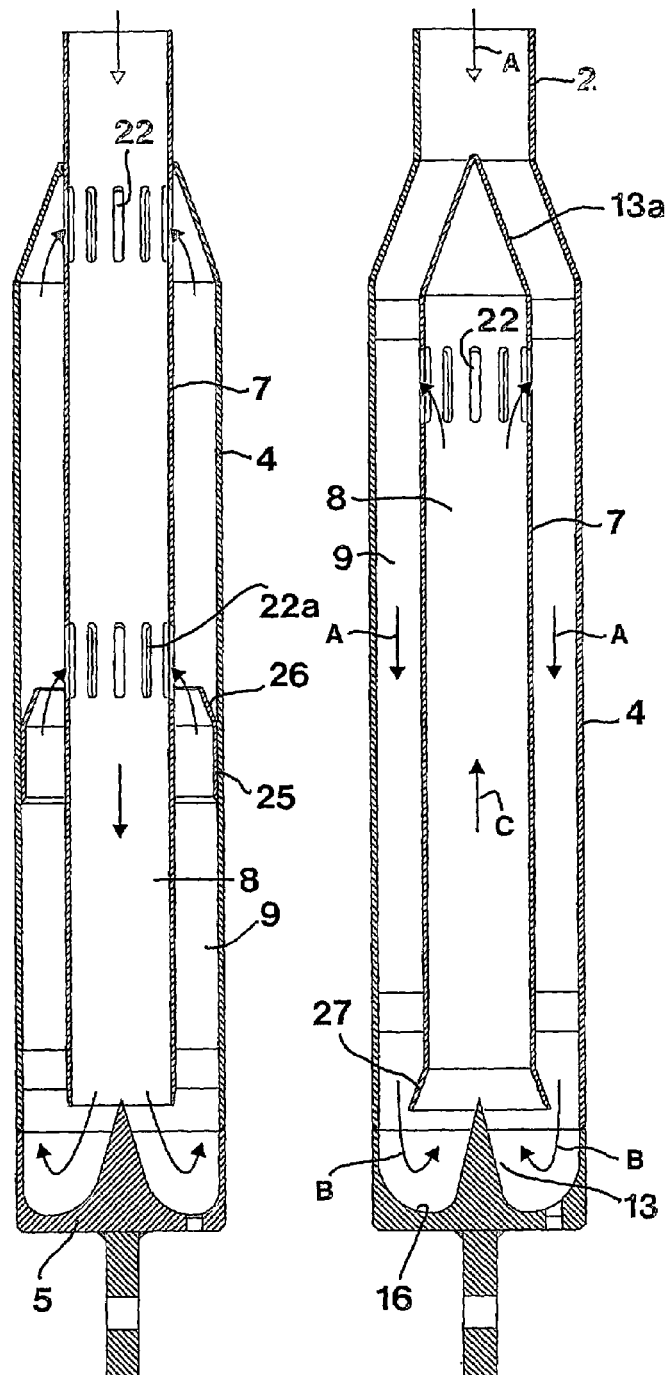
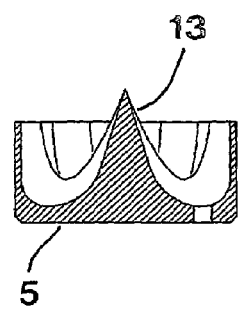
Fig 9
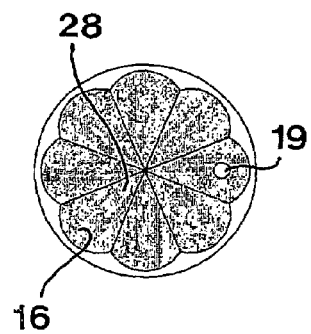
Fig 10
Fig 7
Fig 8

METHOD AND A DEVICE FOR SLOWING DOWN AND DISINTEGRATING A PLUG OF LIQUID PLUNGING FORWARD IN A DUCT

BACKGROUND OF THE INVENTION

1. Field of the Invention

A device having a distributor body slows down and disintegrates a plug of liquid plunging forward in a duct.

2. Description of the Related Art

In nuclear power plants that make use of pressurized water reactors, water is brought under pressure to circulate between the reactor and a boiler. In this conduit system, a pressure-retention tank is included that works as an expansion vessel and has the purpose of absorbing possible variations in pressure in the conduit system. To said pressure-retention tank, a plurality of relief and blow-off valves are connected via particular conduits, which valves have the purpose of becoming opened in order to discharge steam from the pressure-retention tank in case the pressure in the same would unintentionally increase above predetermined maximum permissible values. Immediately up-stream each such valve, a water seal is present that has the purpose of preventing hydrogen gas from reaching and passing the valve (together with the oxygen of the air, hydrogen gas may form explosive detonating gas). The water seal consists of approx. 5-20 l of water that rests in a U-shaped pipe section immediately up-stream the valve. Via a secondary conduit system, the valves communicate with a tank that is denominated blow-off tank.

In the undesired case when the pressure in the pressure-retention tank would come to increase above the maximum permissible value, one or more valves are triggered so far that they are opened in order to discharge the pressurized steam to the blow-off tank. In doing so, the water present in the water seal will be swept along by the discharged steam, and together with the same plunge forward in the secondary conduit system as a plug-like mixture of water and steam. For this reason, those skilled in the art use the denomination "plug of water" for the relatively closely held together volume of water that is put in motion. The individual valve is triggered at a very high pressure. In practice, hence the valve is usually opened at approx. 160-170 bar. This means that the swept-along and forward plunging plug of water obtains an extremely large kinetic energy, meaning that it may exert a very large force on the conduit system in connection with said plug of water changing the direction of flow or slowing down, for instance in bends or the like. In other words, such plugs of water may have a very harmful impact on the secondary conduit system.

BRIEF SUMMARY OF THE INVENTION

The present invention aims at overcoming the above-mentioned problems by providing a device that can slow down and disintegrate a plug of water or liquid plunging forward in a duct before the plug accelerates to a high velocity. Thus, a primary object of the invention is to provide a device that can be mounted closely behind a relief or blow-off valve in the secondary conduit system, or at all events upstream the components included in the same that is to be protected, in order to be able to break the force of, disintegrate, and smoothly slow down a possibly released plug of water so that the same becomes extincted before it reaches any bend, T-piece or the like, and may exert harmfully large impulsive forces on the same. An additional object is to provide a structurally simple, but simultaneously reliably working device that in a smooth way can be connected to an existing conduit system.

In an additional aspect, the invention also relates to a method of slowing down and disintegrating a forward plunging plug of liquid.

In an additional aspect, the invention also relates to a method of slowing down and disintegrating a forward plunging plug of liquid.

The invention is based on the idea of connecting a container to a conduit or duct in which a plug of water may come to plunge forward, in the interior of which container an inner tube is arranged that separates an inner hollow space from an outer, cross-section-wise ring-shaped hollow space, as well as of arranging a suitably conically tapering distributor body in the container, which body is hit by the plug of water entering the container in order for said plug to become divided or split and distributed sidewards, and a bottom included in the container being formed with a concavely curved guide surface, by means of which the disintegrated water becomes smoothly deflected and diverted from one of the hollow spaces to the other one, so that the water in a final phase can flow in a counterflow towards the entering plug of liquid. Advantageously, in the inner tube, one or more sets of holes are formed that enable radial communication between the two hollow spaces. In this way, steam and/or disintegrated water moving in counterflow can be returned into the entering plug of water.

BRIEF DESCRIPTION OF THE DRAWING FIGURES

FIG. 1 is a partially cut perspective view of a device constructed in accordance with the invention, the main component of which consists of an outer container, FIG. 2 is a vertical section through the container and the interior thereof, FIG. 3 is a cross-section A-A in FIG. 2, FIG. 4 is a cross-section B-B in FIG. 2, FIG. 5 is a section through a bottom part included in the container, FIG. 6 is an enlarged section showing a detail of the device, FIG. 7 is a section corresponding to FIG. 2 and showing an alternative embodiment of the invention, FIG. 8 is a section showing an additional alternative embodiment, FIG. 9 is a section through an alternative bottom part of the container, and FIG. 10 is a planar view from above of the bottom part according to FIG. 9.

DETAILED DESCRIPTION OF PREFERRED EMBODIMENTS OF THE INVENTION

In FIG. 1, 1 generally designates a long narrow container that at one end thereof —in this case the upper end —has an inlet 2 for receiving a plug of water, and at the opposite end thereof has a sturdy fastening ear 3, by means of which the container can be held in place in a mounted state. In the example, the container 1 is composed of a cylindrical tube 4, an end wall or bottom 5 distanced from the inlet 2, as well as a closing wall 6, which extends between the tube 4 and the inlet 2. In practice, the container is suitably—though not necessarily—mounted in the vertical state shown, meaning that the end wall 5 forms a bottom. The container has a considerably larger volume than the plug of water of at most approx. 20 l that is to be received in the same. In a concrete embodiment example, hence the tube 4 has a length of approx. 1.5 m and a diameter of approx. 0.3 m, i.e., a volume of approx. 0.1 cubic meter.

Inside the tube 4, an inner tube 7 is arranged having a smaller diameter than the tube 4. Said tube 7 delimits an inner, central hollow space from an outer hollow space 9 of ring-shaped cross-section shape. In the embodiment shown in FIGS. 1 and 2, the diameter of the tube 7 should be chosen in such a way that the cross-section area of the inner hollow space 8 becomes smaller than the cross-section area of the ring-shaped hollow space 9. In practice, hence the outer hollow space 9 may have a cross-section area—and thereby a volume—that is 2 to 3 times larger than the cross-section area and the volume, respectively, of the inner hollow space 8. At the lower end 10 thereof, the tube 7 is open towards the bottom 5.

In the embodiment shown in FIGS. 1 and 2, the inlet 2 constitutes a part of the tube 7, viz. the cylindrical, upper part of the tube that protrudes above the wall 6. Said wall 6, which has the purpose of closing the upper part of the outer tube 4, has the shape of a cone, i.e., a ring-shaped, conical sheet-metal plate, the narrow end of which is connected to the outside of the inner tube via a first weld 11, and the wide end of which is connected to the upper edge of the outer tube 4 via a second weld 12.

The part of the inner tube 7 that forms the inlet 2 may in a suitable way (not shown) be connected to the secondary conduit system, mentioned in the preamble. Advantageously, the inner tube 7 is installed in the axial extension of a tube (not shown) included in the conduit system. Up-stream the inlet 2, a preferably inclined branch conduit is arranged, through which the steam may be diverted at the same time as the forward plunging plug of water can be directed axially into the tube 7, such as is shown by means of the arrows A.

In the axial trajectory of the plug of water, a water-splitting or water-dividing distributor body 13 is arranged, which in the example according to FIGS. 1 and 2 is included in the bottom part 5. More precisely, the distributor body 13 consists of a conical body having an envelope surface 14, which from an upper or front tip 15 diverges in the direction downwards to a circular interruption line, where it transforms into a concavely curved guide surface 16. Said guide surface, which is rotationally symmetrical so far that it extends continuously around the conical body 13, is composed of two different part surfaces having different bending radii R1, R2. Accordingly, the curved part surface situated closest to the conical body 13 has a bending radius R1 that is larger than the radius R2 of the peripherically located part surface. The last-mentioned part surface transforms in turn, via a smoothly rounded transition surface, into a smooth inside of a cylindrical border 17, which protrudes from the rest of the bottom part. At the upper edge thereof, said border 17 is connected to the lower edge of the outer tube 4 via a weld 18. In the bottom part, there is also a drain hole 19 to which a drain pipe (not shown) may be connected.

At the upper end thereof, the inner tube 7 is firmly connected to the upper part of the outer tube via the cone 6 and the welds 11, 12. In order to hold also the lower end of the inner tube firmly in place, a number of radial struts 21, e.g., in the form of flat bars, are arranged, which may be fixed by means of welds against the inside of the outer tube and the envelope surface of the inner tube, respectively.

In the area of the upper end thereof, the inner tube 7 is formed with a number of through holes 22. In practice, said holes 22 may be equidistantly spaced-apart along of the tube periphery and have an elongate basic shape. As shown in FIG. 6, the upper and lower end surfaces 23 of the hole edges may advantageously be chamfered, more precisely in such a manner that the upper end surface of the hole edges extends at an obtuse angle and the lower at an acute angle to the inside of the tube wall. In the example, the number of holes amounts to 12. As is clearly seen in FIG. 2, the lower end portion of the inner tube 7 is formed with a conically chamfered surface 24. From FIG. 2 is further seen that the tip 15 of the conical body 13 is situated approximately on a level with the lower opening 10 of the inner tube 7.

The two tubes 4, 7 and the cone 6 may advantageously be manufactured from approx. 10 mm thick sheet-metal plate, e.g., acid-proof sheet-metal plate, while the bottom part 5 is formed from a strong workpiece of metal, e.g., by lathe machining.

The Function of the Device According to the Invention

When a released plug of water is received via the inlet 2, it will move axially in the direction of the arrows A and first hit the conical distributor body 13, which splits the plug and disintegrates the same so that the water is distributed in all directions sidewards from the distributor body. After this, the water is directed, via the guide surface 16, in a smoothly rounded flow out towards the border 17 of the bottom part 5 in the direction of the arrows B, the direction of flow being reversed. After the reversal, the water flows upwards in the direction of the arrows C in the outer hollow space 9. Conducted experiments have shown that different scenarios may arise depending on the prevailing pressure. At high pressures, the water plunging in via the inlet 2 is directed partly out through the holes 22 in the upper part of the inner tube 7 and meets the main water flow that becomes deflected by the guide surface 16 and moves upwards in the hollow space 9. Fairly quickly, the plug of water becomes extincted by the fact that the kinetic energy thereof is converted to heat energy, the water being accumulated in the bottom zone of the container. When the water has calmed down, the same is automatically drained out via the diminutive hole 19, which always is open to the appurtenant drain pipe. It may also occur that air and/or steam that is present in the outer hollow space 9 will be pressed upwards through the outer hollow space when the water penetrates into the lower part of the outer hollow space, wherein the air/steam mixture can pass in the direction inwards through the holes 22 and meet at least parts of the plunging-in plug of water in counterflow against the same. Already in conjunction herewith, hence a certain deceleration of the plunging-in water takes place.

The above-mentioned experiments have shown that the plug of water disperses and slows down in a controlled way without giving rise to other than moderate forces. Accordingly, in practice the measured forces have turned out to amount to only ⅓ or ¼ of the theoretical force that estimately can be calculated by means of the law of momentum conservation at a redirection of 180°.

Alternative Embodiments of the Invention

In FIG. 7, an alternative embodiment is shown that differs from the embodiment according to FIGS. 1 and 2 only so far that an additional set of holes 22a has been formed in the inner tube 7. In the example, said set of holes 22a is located approximately halfway between the upper set of holes 22 and the lower end 10 of the inner tube 7. On the outside of the set of holes 22a, a collar 25 is arranged having a conically shaped guiding flange 26, which has the purpose of directing the pressed-up fluid (air and/or water) in the direction inwards to the holes with the purpose of additionally contributing to a deceleration or retardation of the plunging-in plug of water. Via the holes 22a, air as well as water can thus meet the plug of water in a counterflow at an earlier stage than the fluid being returned via the upper set of holes 22.

In FIG. 8, another method of slowing down and disintegrating the arriving plug of water is shown. In this case, a conical distributor body 13a is arranged on the upper part of the inner tube 7 for splitting the plug of water already when the same has passed the inlet 2. After this, the disintegrated water is directed in an axial flow downwards in the direction of the arrows A through the outer hollow space 9. Via a guide surface 16 and a conical body 13, the water flow is redirected, such as is shown by means of the arrows B, and then the water is returned up through the inner hollow space 8 in the direction of the arrow C. Also in this case, circulation of fluid between the two hollow spaces can take place via at least one upper set of holes 22 in the inner tube 7.

At the lower end thereof, the inner tube 7 is, in this case, formed with a conical, corbelling-out flange 27, by means of which the entering water is directed out radially in the direction of the inside of the outer tube. In this way, the tendency of the water to be pressed against the internal surface of the outer tube and the guide surface 16 in the extension of the same is optimized. Thanks to the conical body 13 included in the bottom part, it is guaranteed (in combination with the conical flange 27) that a centering of the redirected and reversed water flow occurs, so that the water in a reliable way is returned up through the inner hollow space 8.

In FIG. 8, the inner tube 7 is, for the sake of simplicity, shown with the same diameter as in the embodiments according to FIGS. 1, 2 and 7. In practice however, the inner tube 7 in the embodiment according to FIG. 8 should have a proportionally larger diameter, so that the hollow space, viz. the inner hollow space 8, in which the deflected water is captured and slows down, gets a larger volume than the hollow space, viz. the outer hollow space 9, through which the water passes before reversing. Also in this case, the receiving hollow space, i.e., the inner hollow space 8, should have a volume that is at least 2 to 3 times larger than the hollow space through which the water is entered.

In FIGS. 9 and 10, an alternative embodiment of a bottom part 5 is shown, which is formed with a central, upwardly pointing body 13 that still has a tapering shape, but is, in this case, not genuinely conical. Accordingly, the body 13 according to FIGS. 9, 10 is formed with a plurality (in the example 8) of concavely curved flutes 28 that diverge in the direction of the periphery of the bottom part and transform into concavely curved, sector-shaped part surfaces, which together form the guide surface 16. The bottom part shown in FIGS. 9 and 10 may be used in the embodiments according to FIGS. 1, 2 and 7 as well as in the embodiment according to FIG. 8.

Feasible Modifications of the Invention

The invention is not limited only to the embodiments described above and shown in the drawings. Although the inner tube as well as the outer have the shape of cylinders, hence it is feasible to give said components another shape. For instance, it is possible to form the inner tube slightly conical, more precisely in a way that the same diverges in a moderate angle towards the lower, open end. In this way, the particular flange 27 in the embodiment according to FIG. 8 would be possible to be spared. Further, in the embodiment according to FIG. 8, it is feasible to locate a conical or in another way tapering body in the area below the set of holes in the inner tube, more precisely with the tip of the body facing downwards, with the purpose of directing out the upwardly flowing water in the direction outwards to the holes. Furthermore, in the area of the transition between the curved guide surface of the bottom and the inside of the outer tube, it is feasible to form a plurality of spaced-apart, small projections with the purpose of tearing the deflected water and disintegrating the same further into smaller constituent parts. The device according to the invention may of course also be used for other liquids than only water.

The invention claimed is:

1. A device for slowing down and disintegrating a plug of liquid plunging forward in a duct, comprising:
a container (1) having a bottom (5) and an opposite inlet (2), which is connectable to the duct and through which the plug or liquid can be directed into a central, axial trajectory in the container, that inside the container an inner tube (7) being open towards the bottom (5) is arranged, which tube separates an inner hollow space (8) from an outer, cross-section-wise ring-shaped hollow space (9), that in a trajectory of the entering plug of liquid a distributor body (13, 13a) is arranged in the bottom of the container for splitting and disintegrating the plug of liquid as well as throwing out the disintegrated constituent parts of liquid in a direction outwards from the centre, the distributor body (13, 13a) having a shape that tapers in a direction against a flow of the entering plug of liquid, and that the bottom (5) comprises a concavely curved guide surface (16) configured for diverting the liquid from one of the hollow spaces to the other one in order to, in this way, reverse a direction of motion of the liquid.

2. The device according to claim 1, wherein the distributor body (13) is arranged adjacent to the bottom (5) of the container and that the inner tube (7) and the inlet (2) are arranged in alignment, one after the other, the inner tube (7) being arranged to direct the entering plug of liquid through the inner hollow space (8) up to the distributor body (13), and the curved guide surface (16) being arranged to deflect the disintegrated liquid out in the outer hollow space (9) in order to, in the same, compel the liquid to move in the opposite direction against the direction of motion of the entering plug of liquid.

3. A device for slowing down and disintegrating a plug of liquid plunging forward in a duct, comprising:
a container (1) having a bottom (5) and an opposite inlet (2), which is connectable to the duct and through which the plug of liquid can be directed into a central, axial trajectory in the container, that inside the container an inner tube (7) being open towards the bottom (5) is arranged, which tube separates an inner hollow space (8) from an outer, cross-section-wise ring-shaped hollow space (9), that in a trajectory of the entering plug of liquid a distributor body (13, 13a) is arranged in the bottom of the container for splitting and disintegrating the plug of liquid as well as throwing out the disintegrated constituent parts of liquid in a direction outwards from the centre, and that the bottom (5) comprises a concavely curved guide surface (16) configured for diverting the liquid from one of the hollow spaces to the other one in order to, in this way, reverse a direction of motion of the liquid,
wherein the distributor body (13) is arranged adjacent to the bottom (5) of the container and that the inner tube (7) and the inlet (2) are arranged in alignment, one after the other, the inner tube (7) being arranged to direct the entering plug of liquid through the inner hollow space (8) up to the distributor body (13), and the curved guide surface (16) being arranged to deflect the disintegrated liquid out in the outer hollow space (9) in order to, in the same, compel the liquid to move in the opposite direction against the direction of motion of the entering plug of liquid, and wherein the outer hollow space (9), at the end thereof distanced from the bottom (5), is closed by means of an end wall (6) extending between the container and the inner tube.

4. The device according to claim 1, wherein the distributor body (13a) is arranged at an end of the inner rube (7) located up-stream for splitting and disintegrating the arriving plug of liquid immediately after the passage thereof through the inlet (2) and directing the disintegrated liquid through the outer hollow space (9) up to the bottom (5), where the curved guide surface (16) thereof redirects the liquid into a reversed flow inside the inner tube.

5. The device according to claim 4, wherein the inner tube (7) includes at least one guiding flange (27) with the purpose of directing the liquid passing through the outer hollow space (9) radially outwards to the inside of the container.

6. The device according to claim 1, wherein the container (1) comprises a rotationally symmetrical outer tube (4) that is concentric with a likewise rotationally symmetrical inner tube (7).

7. The device according to claim 1, wherein the distributor body (13, 13a) has a conical envelope surface (14) extending from a tip.

8. The device according to claim 3, wherein the inner tube includes a set of holes (22, 22a) through which fluid can be directed back from one of the hollow spaces to the other.

9. The device according to claim 8, wherein the inner tube (7), in addition to a first set of holes (22) located in the vicinity of the closing end wall (6) between the container and the inner tube, comprises at least one second set of holes (22a) located closer to the open end (10) of the inner tube, which set of holes co-operates with a collar (25) that aims at directing axially flowing air and/or liquid inwards towards the holes (22a).

10. Method of slowing down and disintegrating a plug of liquid plunging forward in a duct, characterized in that the plug of liquid, via an inlet (2), is directed into a central, axial trajectory In a container (1) that is closed by means of a bottom (5), inside which container an inner tube (7) is arranged that opens towards the bottom, which tube delimits an inner hollow space (8) from an outer, cross-section-wise ring-shaped hollow space (9), and is brought to hit a distributor body (13, 13a) that tapers in the counterflow direction with the purpose of becoming split and disintegrated by the same, and the disintegrated liquid being brought to pass along a concavely curved guide surface (16) in order to redirect the liquid from one of the hollow spaces to the other and thereby reverse the direction of motion of the liquid.

11. The device according to claim 2, wherein the container (1) comprises a rotationally symmetrical outer tube (4) that is concentric with a likewise rotationally symmetrical inner tube (7).

12. The device according to claim 3, wherein the container (1) comprises a rotationally symmetrical outer tube (4) that is concentric with a likewise rotationally symmetrical inner tube (7).

13. The device according to claim 4, wherein the container (1) comprises a rotationally symmetrical outer tube (4) that is concentric with a likewise rotationally symmetrical inner tube (7).

14. The device according to claim 5, wherein the container (1) comprises a rotationally symmetrical outer tube (4) that is concentric with a likewise rotationally symmetrical inner tube (7).

15. The device according to claim 2, wherein the distributor body (13, 13a) has a shape that tapers in the direction against the flow of the entering plug of liquid.

16. The device according to claim 3, wherein the distributor body (13, 13a) has a shape that tapers in the direction against the flow of the entering plug of liquid.

17. The device according to claim 4, wherein the distributor body (13, 13a) has a shape that tapers in the direction against the flow of the entering plug of liquid.

18. The device according to claim 5, wherein the distributor body (13, 13a) has a shape that tapers in the direction against the flow of the entering plug of liquid.

19. The device according to claim 6, wherein the distributor body (13, 13a) has a shape that tapers in the direction against the flow of the entering plug of liquid.

* * * * *